(12) United States Patent
Hukkeri et al.

(10) Patent No.: US 10,279,930 B2
(45) Date of Patent: May 7, 2019

(54) WORK SURFACE FAILURE PREDICTION AND NOTIFICATION SYSTEM

(71) Applicant: Caterpillar Inc., Peoria, IL (US)

(72) Inventors: Ramadev Hukkeri, Cranberry Township, PA (US); Joshua C. Struble, Chillicothe, IL (US); Ananth P. Kini, Dunlap, IL (US)

(73) Assignee: Caterpillar Inc., Deerfield, IL (US)

( * ) Notice: Subject to any disclaimer, the term of this patent is extended or adjusted under 35 U.S.C. 154(b) by 176 days.

(21) Appl. No.: 15/199,109

(22) Filed: Jun. 30, 2016

(65) Prior Publication Data

US 2018/0003856 A1    Jan. 4, 2018

(51) Int. Cl.
    *B64G 1/16*    (2006.01)

(52) U.S. Cl.
    CPC .................................. *B64G 1/16* (2013.01)

(58) Field of Classification Search
    CPC .................................................. G01V 11/002
    USPC ............................................................ 702/105
    See application file for complete search history.

(56) References Cited

U.S. PATENT DOCUMENTS

| | | | |
|---|---|---|---|
| 8,615,362 B2 * | 12/2013 | Laake ...................... | G01V 1/30 702/5 |
| 8,744,693 B2 | 6/2014 | Hukkeri et al. | |
| 8,751,103 B2 | 6/2014 | Hukkeri | |
| 8,880,334 B2 | 11/2014 | Kini et al. | |
| 9,298,188 B2 | 3/2016 | Kini et al. | |
| 2003/0055666 A1 * | 3/2003 | Roddy ................ | B61L 27/0094 705/305 |
| 2008/0215185 A1 | 9/2008 | Jacobsen et al. | |
| 2009/0063031 A1 * | 3/2009 | Greiner .................. | G06Q 10/08 701/117 |
| 2010/0198517 A1 * | 8/2010 | Scott ...................... | G01C 15/00 702/5 |
| 2014/0163779 A1 * | 6/2014 | Braunstein ............. | G05D 1/021 701/2 |
| 2014/0163805 A1 | 6/2014 | Braunstein et al. | |
| 2015/0310674 A1 * | 10/2015 | Humphrey ............ | H04W 4/029 701/24 |
| 2016/0078695 A1 * | 3/2016 | McClintic .............. | G06Q 10/06 701/29.4 |

FOREIGN PATENT DOCUMENTS

| | | |
|---|---|---|
| CN | 202793331 U | 3/2013 |
| KR | 101061066 B1 | 8/2011 |

\* cited by examiner

*Primary Examiner* — Ricky Ngon
(74) *Attorney, Agent, or Firm* — Leydig, Voit & Mayer, Ltd.

(57) ABSTRACT

A failure prediction and notification system for a work surface that has a raised contour includes a perception sensor mounted on a machine and a controller. The controller determines an initial physical characteristic of the initial topography of the work surface adjacent the raised contour, generates an electronic map of a current topography of the work surface based at least partially on the raw data points, and determines a current physical characteristic of the current topography. The controller further determines a difference between the current physical characteristic and the initial physical characteristic, compares the difference to a characteristic difference threshold, and generates an alert upon the difference exceeding the characteristic difference threshold.

20 Claims, 7 Drawing Sheets

WORK SURFACE FAILURE PREDICTION AND NOTIFICATION SYSTEM

TECHNICAL FIELD

This disclosure relates generally to failure prediction system, and more particularly, to a system and method for evaluating a work surface including a raised contour and predicting failures of the work surface and generating alerts based upon predicted failures.

BACKGROUND

Mobile machines such as haul machines are often used to haul material from a load location at which material is loaded into the machines to a dump location at which the material is dumped or discharged from the machines. When operating near a crest or high wall, raised contours such as one or more berms are often formed adjacent the high wall to act as a guide and, to some extent a stop, to assist in positioning the haul machines adjacent the high wall during a dumping operation. More specifically, the berms may include a sloped wall that is engaged by the tires of the haul machines to assist in positioning the haul machine for the dumping operations.

When repeatedly operating the machines near the high wall and berm, the material that makes up the high wall and the berm may become unstable and/or require re-building. Such instability may create risks with respect to continued operation of the machines near the high wall and berm. Re-building of the berm may require scheduling of appropriate material-moving machines.

U.S. Patent Publication No. 2008/0215185 discloses an unmanned ground robotic vehicle. The vehicle includes a body with an appendage that may be extended and retracted. A sensing element may be coupled to the appendage to sense the environment at a location spaced from the body. While the sensing element may detect the environment at two different locations, the vehicle is not monitoring changes in the environment over time.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In one aspect, a failure prediction and notification system for a work surface that has a raised contour includes a perception sensor mounted on a machine for generating raw data points reflective of a perceived work environment associated with the machine and a controller. The controller is configured to store a characteristic difference threshold, store an electronic map of an initial topography of the work surface adjacent the raised contour, and determine an initial physical characteristic of the initial topography of the work surface adjacent the raised contour. The controller is also configured to receive the raw data points from the perception sensor, generate an electronic map of a current topography of the work surface adjacent the raised contour based at least partially on the raw data points, and determine a current physical characteristic of the current topography of the work surface adjacent the raised contour. The controller is further configured to determine a difference between the current physical characteristic and the initial physical characteristic, compare the difference between the current physical characteristic and the initial physical characteristic to the characteristic difference threshold, and generate an alert upon the difference between the current physical characteristic and the initial physical characteristic exceeding the characteristic difference threshold.

DETAILED DESCRIPTION

Figure 1:
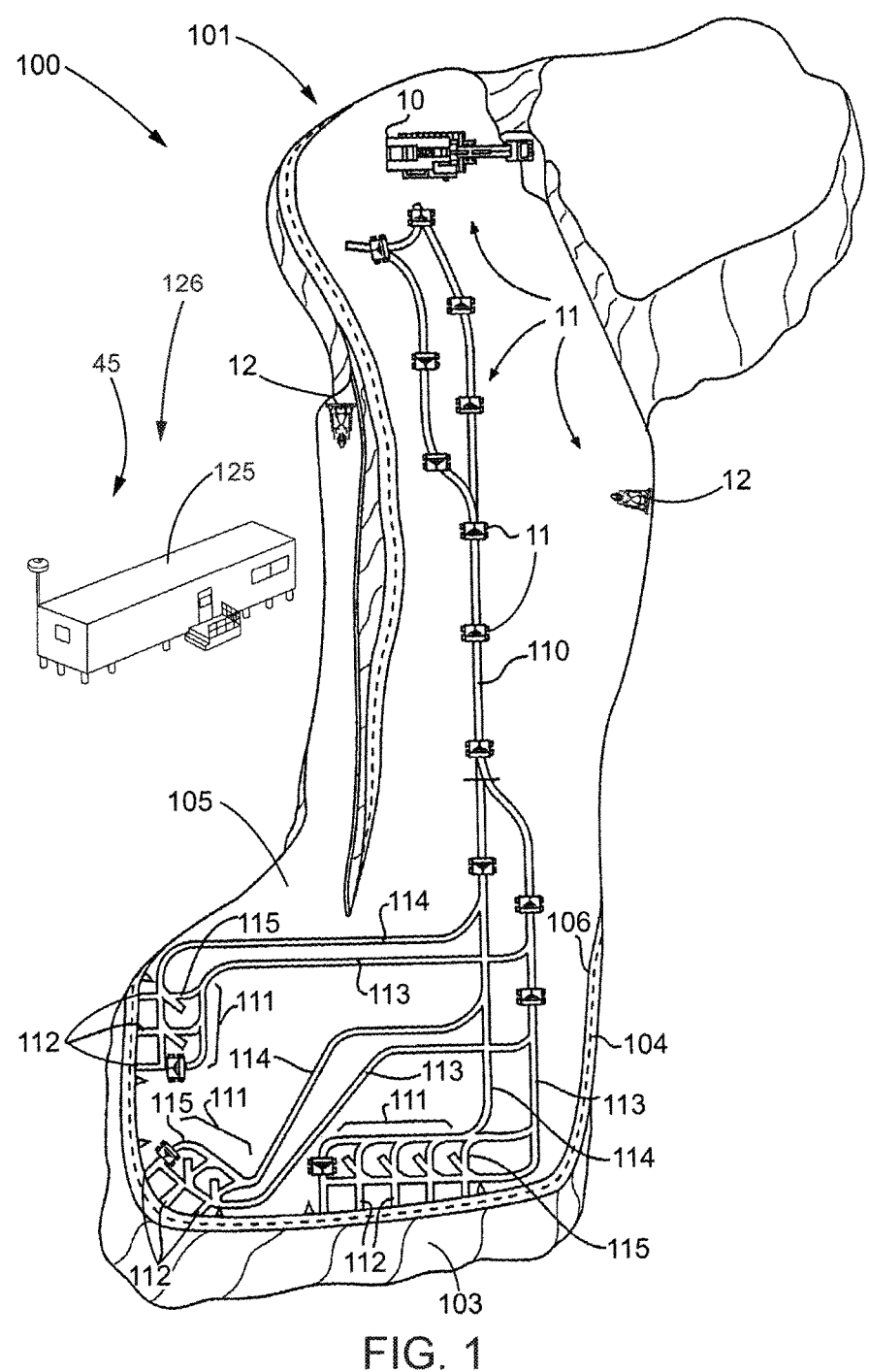
FIG. 1 is a schematic view of an exemplary work site at which a machine incorporating the principles disclosed herein may be used.

FIG. 1 depicts a diagrammatic illustration of an exemplary work site 100 at which one or more machines may operate in an autonomous, a semi-autonomous, or a manual manner. Work site 100 may be a portion of a mining site, a landfill, a quarry, a construction site, or any other type of work site. Tasks associated with the work site 100 may include a dozing operation, a grading operation, a dumping operation, a bulk material removal operation, or any other type of operation that results in the alteration of the current topography at work site 100.

Work site 100 may include multiple locations designated for particular purposes. For example, a first location may be designated as a load location 101 at which a loading machine such as an excavator 10 or other resource operates to fill one or more haul machines 11 with material. A second location may be designated as a dump location 102 at which haul machines 11 discharge their payloads. In the disclosed embodiment, the dump location 102 is positioned at an edge of a steep incline, crest, or cliff area often referred to as a high wall 103. In this embodiment, haul machines 11 may operate to discharge their payloads over the edge of the high wall 103. Haul machines 11 may follow a main travel path 110 that generally extends between load location 101 and dump location 102. Mobile material moving machines such as a dozer 12 may operate at the dump location 102 to establish and maintain the dump location by moving material such as by forming and maintaining a raised contour of material such as a berm 104 that extends upward from work surface 105 adjacent the high wall 103.

Dump location 102 may be divided into groupings 111 of dump targets 112 at which haul machines 11 may discharge their payloads. Each grouping 111 may be assigned an entrance path 113 and an exit path 114 that connect with main travel path 110, and individual travel lanes 115 that extend between each dump target 112 and opposing second ends of the corresponding entrance path 113 and exit path 114. It is contemplated that dump location 102 may have any number of groupings 111. By having multiple groupings 111 at dump location 102, more than one haul machine 11 may operate at dump location 102 at the same time without traffic problems and significant time delays along entrance paths 113 and exit paths 114.

Machines such as haul machines 11 may be configured to be operated autonomously, semi-autonomously, or manually. When operating semi-autonomously or manually, a machine may be operated by remote control and/or by an operator physically located within a cab 25 of the machine. As used herein, a machine operating in an autonomous manner operates automatically based upon information received from various sensors without the need for human operator input. A machine operating semi-autonomously includes an operator, either within the machine or remotely, who performs some tasks or provides some input and other tasks are performed automatically and may be based upon information received from various sensors. A machine being operated manually is one in which an operator is controlling all or essentially all of the functions of the machine. A machine may be operated remotely by an operator (i.e., remote control) in either a manual or a semi-autonomous manner.

Figure 2:
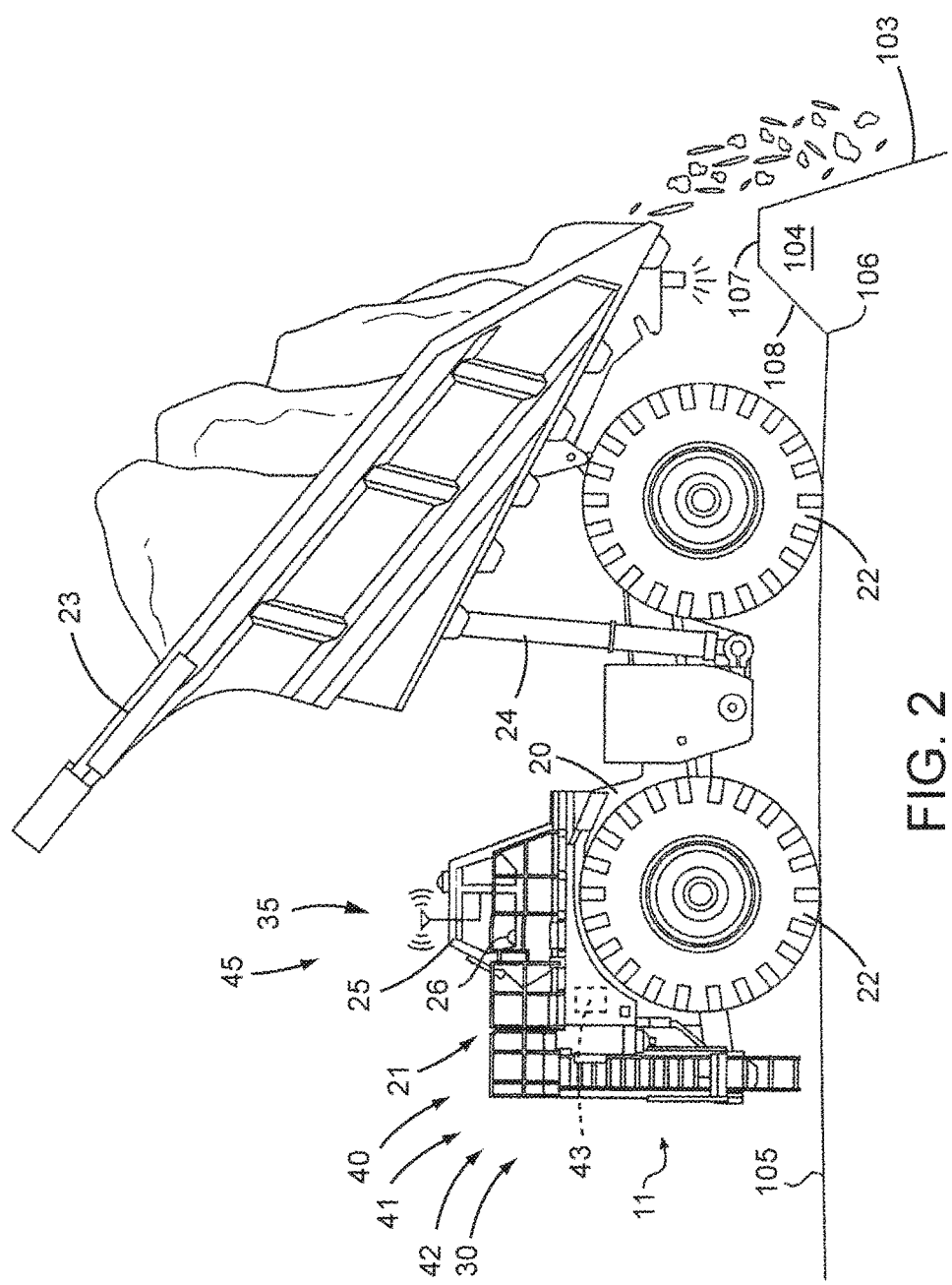
FIG. 2 is a diagrammatic view of a haul machine in accordance with the disclosure.

FIG. 2 depicts a diagrammatic illustration of a haul machine 11 for hauling or transporting material. The haul machine 11 includes a frame 20, and a prime mover such as engine 21 may be operatively connected to drive wheels 22 to propel the machine. The haul machine 11 may use any type of machine propulsion and drivetrain mechanisms including hydrostatic, electric, or a mechanical drive. A payload container 23 may be pivotally mounted on frame 20 and configured to carry material. Actuators such as hydraulic cylinders 24 may extend between the frame 20 and the payload container 23. The actuators may be actuated to dump the material that is within the payload container 23 as desired.

Haul machine 11 may include a cab 25 that an operator may physically occupy and provide input to control the machine. Cab 25 may include one or more input devices 26 through which the operator may issue commands to control the propulsion and steering of the machine as well as dump the payload container 23.

Haul machine 11 may be controlled by a control system 40 as shown generally by an arrow in FIG. 2 indicating association with the machine. The control system 40 may include an electronic control module or controller 41 and a plurality of sensors. The controller 41 may receive input signals from an operator. The controller 41 may control the operation of various aspects of the haul machine 11 including the drivetrain and the hydraulic systems.

The controller 41 may be an electronic controller that operates in a logical fashion to perform operations, execute control algorithms, store and retrieve data and other desired operations. The controller 41 may include or access memory, secondary storage devices, processors, and any other components for running an application. The memory and secondary storage devices may be in the form of read-only memory (ROM) or random access memory (RAM) or integrated circuitry that is accessible by the controller. Various other circuits may be associated with the controller 41 such as power supply circuitry, signal conditioning circuitry, driver circuitry, and other types of circuitry.

The controller 41 may be a single controller or may include more than one controller disposed to control various functions and/or features of the haul machine 11. The term "controller" is meant to be used in its broadest sense to include one or more controllers and/or microprocessors that may be associated with the haul machine 11 and that may cooperate in controlling various functions and operations of the machine. The functionality of the controller 41 may be implemented in hardware and/or software without regard to the functionality. The controller 41 may rely on one or more data maps relating to the operating conditions and the operating environment of the haul machine 11 and the work site 100 that may be stored in the memory of or associated with the controller. Each of these data maps may include a collection of data in the form of tables, graphs, and/or equations.

The control system 40 and controller 41 may be located on the haul machine 11 as an on-board control system 42, as shown generally by an arrow in FIG. 2 indicating association with the machine, with an on-board controller 43, or may be distributed with components such as an off-board controller 126 also located remotely from or off-board the machine such as at a command center 125 (FIG. 1) located on-site or off-site. The functionality of control system 40 may be distributed so that certain functions are performed at haul machine 11 and other functions are performed remotely.

Figure 4:
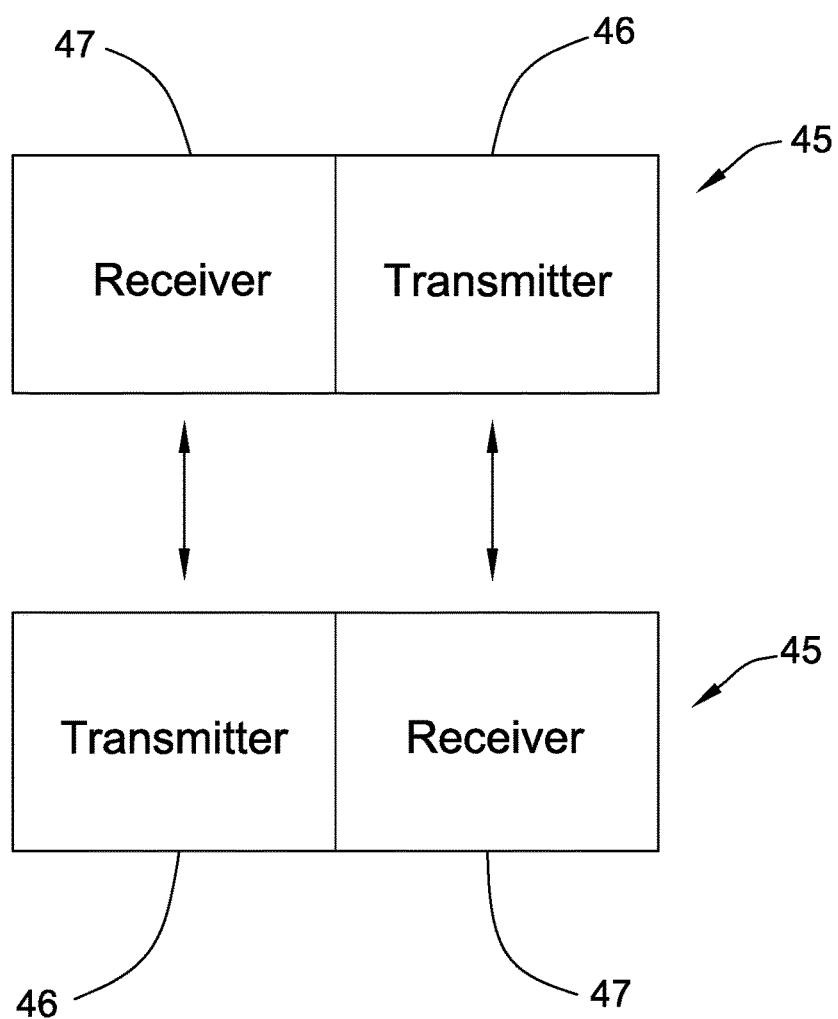
FIG. 4 is a schematic view of a wireless communications system.

Each of haul machine 11 and the command center 125 may include a wireless communications system 45 to permit wireless transmission of information between the haul machine 11 and the command center 125. In one embodiment depicted in FIG. 4, each wireless communications system 45 may include a transmitter 46 for transmitting signals from one wireless communications system and a receiver 47 for receiving signals from a transmitter system of another wireless communications system. In some instances, the transmitter 46 and the receiver 47 may be combined as a transceiver system. The wireless communications system 45 may implement or utilize any desired system or protocol including any of a plurality of communications standards. Some or all of the machines at the work site 100 may include a wireless communications system 45. The machines may communicate directly between the machines through the wireless communications system 45 on-board the machines and/or through the wireless communications system 45 at the command center 125.

Figure 3:
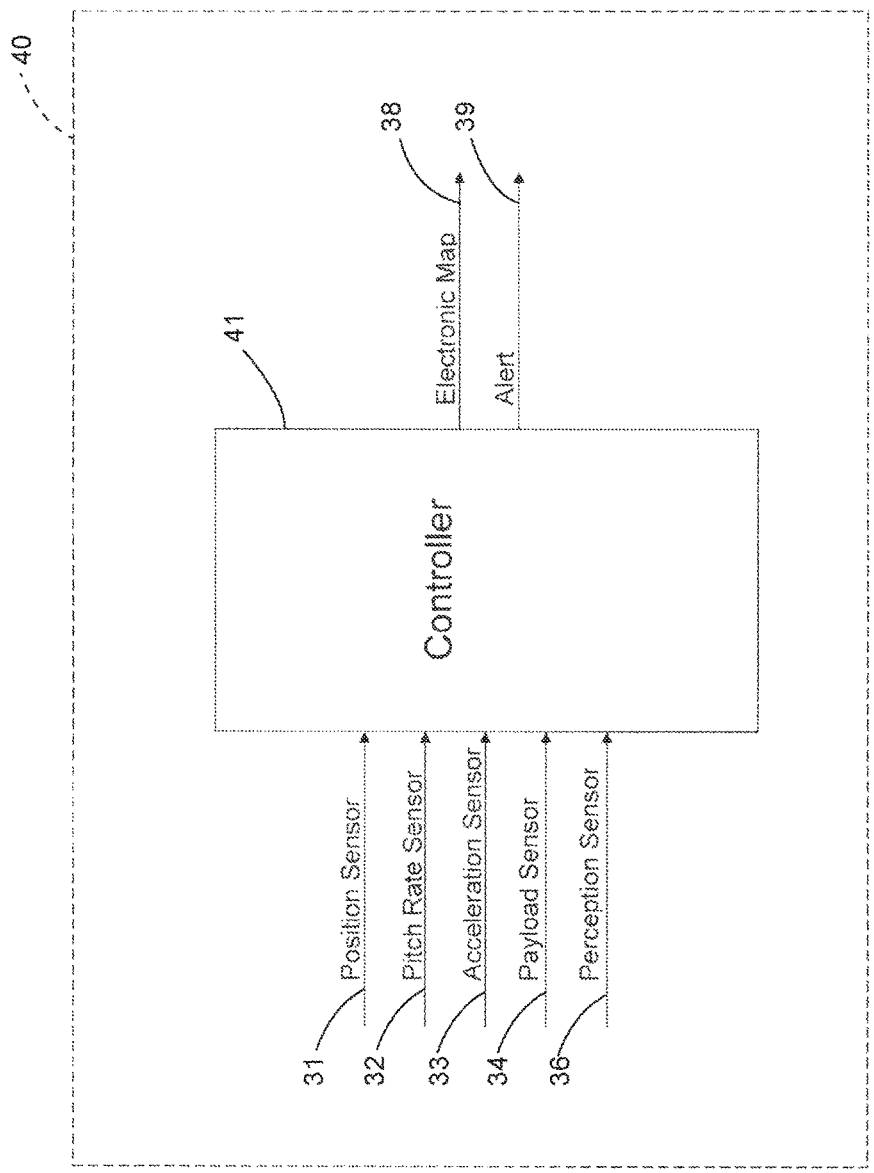
FIG. 3 is a block diagram of a failure prediction and notification system in accordance with the disclosure.

Referring to FIG. 3, haul machine 11 may be equipped with a plurality of machine sensors that provide data indicative (directly or indirectly) of various operating parameters of the machine and/or the operating environment in which the machine is operating. The term "sensor" is meant to be used in its broadest sense to include one or more sensors and related components that may be associated with the haul machine 11 and that may cooperate to sense various functions, operations, and operating characteristics of the machine and/or aspects of the environment in which the machine is operating.

A position sensing system 30, as shown generally by an arrow in FIG. 2 indicating association with the haul machine 11, may include a position sensor 31 (FIG. 3) to sense the position and orientation (i.e., the heading, pitch, roll or tilt, and yaw) of the machine relative to the work site 100. The position and orientation of the haul machine 11 are sometimes collectively referred to as the pose of the machine. The position sensor 31 may include a plurality of individual sensors that cooperate to generate and provide position signals to controller 41 indicative of the position and orientation of the haul machine 11.

In one example, the position sensor 31 may include one or more sensors that interact with a positioning system such as a global navigation satellite system or a global positioning system to operate as a position sensor. In another example, the position sensor 31 may further include an inertial measurement unit and/or a slope or inclination sensor such as pitch angle sensor for measuring the slope or inclination of the haul machine 11 relative to a ground or earth reference. The controller 41 may use position signals from the position sensor 31 to determine the position of the haul machine 11 within work site 100. In other examples, the position sensor 31 may include an inertial measurement unit and/or other localization systems such as lasers, sonar, and radar, cameras, or other systems to determine all or some aspects of the position of haul machine 11 relative to a known datum or reference.

Additional sensors may be provided such as pitch rate sensor 32 (e.g., a gyroscope) and acceleration sensor 33 (e.g., a 3-axis accelerometer). In addition, haul machine 11 may include a payload container sensor 34 to determine the position of the payload container 23 relative to frame 20 or some other point of reference.

Figure 5:
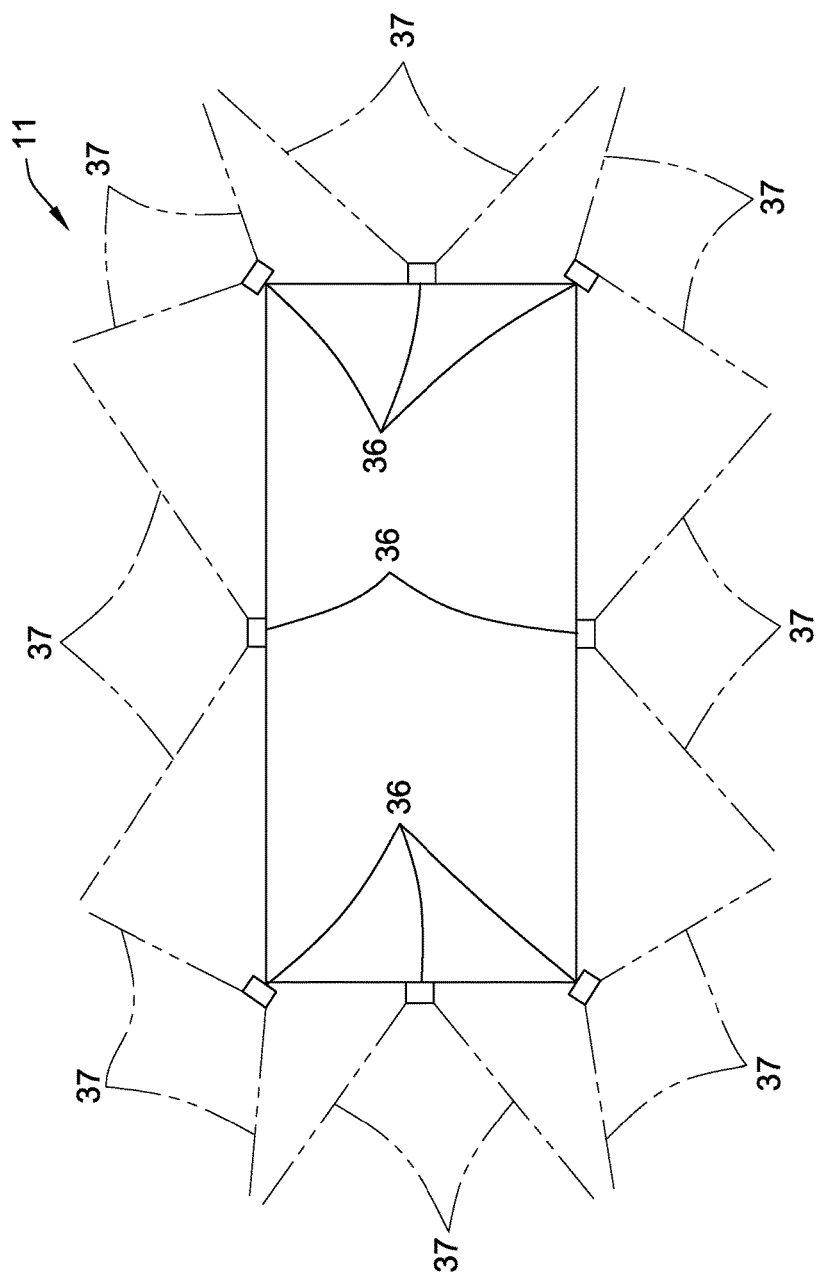
FIG. 5 is a schematic top plan view of the haul machine of FIG. 2.

A perception system 35 may be mounted on or associated with the haul machine 11, as shown generally by an arrow in FIG. 2 indicating association with the machine. The perception system 35 may include one or more systems such as a radar system, a SONAR system, a LIDAR system, a camera vision system, and/or any other desired system that operate with associated perception sensors 36 (FIG. 5). Perception sensors 36 may generate data that is received by the controller 41 and used by the controller to determine the position of the work surface and the presence and position of obstacles within the range of the sensors. The field of view of each perception sensor 36 is depicted schematically in FIG. 5 by reference number 37.

The perception system 35 may be used to generate an electronic map 38 (FIG. 3) and/or images of the environment around haul machine 11. The perception system 35 may use the plurality of perception sensors 36 mounted on the haul machine 11 to generate perception data from a plurality of points of view relative to the haul machine 11. Each perception sensor 36 may be mounted on the haul machine 11 at a relatively high vantage point. As depicted schematically in FIG. 5, eight perception sensors 36 are provided that record or sense images in the forward and rearward directions as well as to each side of haul machine 11. The perception sensors 36 may be positioned in other locations as desired. Controller 41 may receive perception data from the perception sensors 36 and, in some instances, generate video and/or still images based upon such perception data.

In another embodiment, the perception system 35 may include a plurality of perception sensors 36 movably associated with the haul machine 11 such as sensors mounted on a mobile machine or device including a drone or unmanned aerial vehicle (not shown). Data from the perception sensors 36 may be transmitted to the haul machine 11 or another system remote from the machine wirelessly or in a wired manner. In still another embodiment, an unmanned aerial vehicle (not shown) having perception sensors 36 may operate at the work site 100 and provide perception data to a system remote from the haul machine 11 along a wireless connection.

Figure 6:
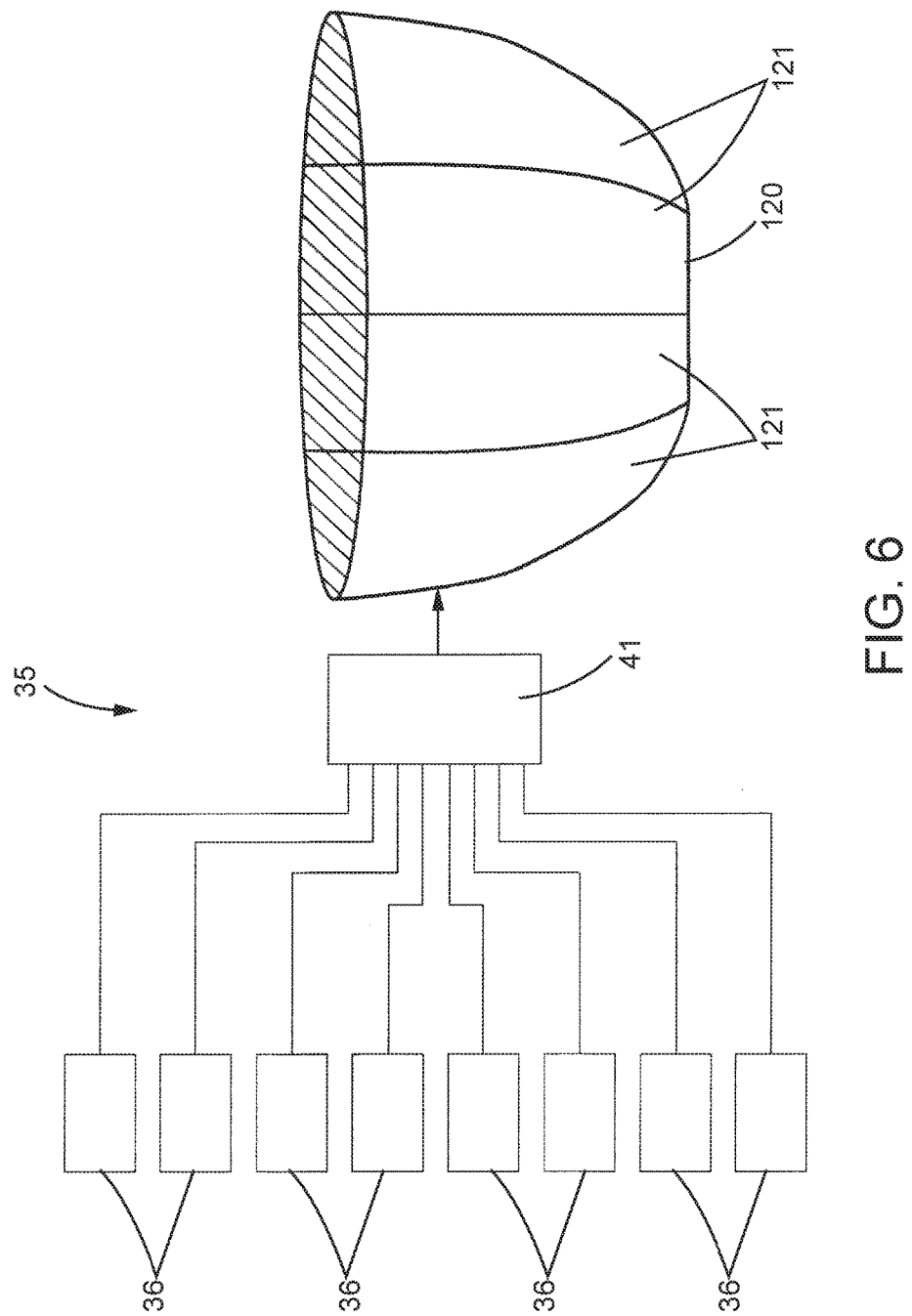
FIG. 6 is a schematic view of a perception system generating an unified image in accordance with the disclosure.

In some embodiments, controller 41 may combine the raw data points or image data captured by the perception sensors 36 into a unified image 120 (FIG. 6) of a portion of the work site 100 adjacent and surrounding the haul machine 11. FIG. 6 is a pictorial illustration of one example of controller 41 combining image data from each of the perception sensors 36 to generate the unified image 120 of the perceived work environment associated with the haul machine 11. The unified image 120 may represent all image data available for the environment adjacent haul machine 11. In one example, the unified image 120 represents a 360-degree view or model of the environment of haul machine 11 with haul machine 11 at the center of the 360-degree view. According to some embodiments, the unified image 120 may be a non-rectangular shape. For example, the unified image 120 may be hemispherical and haul machine 11 may be conceptually located at the pole, and in the interior, of the hemisphere.

Controller 41 may generate the unified image 120 by mapping raw data points captured by the perception sensors 36 to an electronic or data map. The electronic map 38 may be divided into sections 121, with each section corresponding to one set of raw data points. The mapping may correlate a two-dimensional point from a perception sensor 36 to a three-dimensional point on the map used to generate the unified image 120. For example, a raw data point of the image data located at (1, 1) may be mapped to location (500, 500, 1) of the unified image. The mapping may be accomplished using a look-up table that may be stored within or associated with controller 41. The look-up table may be configured based on the position and orientation of each perception sensor 36 on haul machine 11. Other methods for mapping image data may be used as desired.

The perception sensors 36 may include and/or be associated with a timing device or element (not shown) to establish or compute a time designation for each data point or signal. The time designation may be associated with or appended to each raw data point to maintain a record as to when each data point or signal was generated. The time designation may be measured relative to any desired system. Accordingly, the data within the unified or electronic map 38 may further include the time at which the data was collected.

During or before a material moving operations, one or more dozers 12 may be operated to build a structure or raised contour such as a berm 104 that extends along the length of the high wall 103. In doing so, operators may move material around the work site 100 to a position adjacent the high wall 103. Berm 104 may be any size and, in one example, may be approximately 6 feet tall. Referring to FIG. 2, the berm 104 includes a toe or inner edge 106 at the intersection of the beginning of the berm (i.e., farthest from high wall 103) and the work surface 105. An upper surface or top wall 107 may be generally flat or have another configuration and a sloped sidewall 108 may extend between the inner edge 106 and the top wall.

An electronic map 38 of the berm 104 may be generated during or after the formation of the berm. The electronic 38 map may be created in any desired manner. In one example, the electronic map may be created by the machines such as dozers 12 used to form the berm 104. In another example, one or more machines or devices with a plurality of sensors may be used to generate the electronic map 38 of the berm 104. In one embodiment, the machines or devices operative to generate the electronic map 38 of the berm 104 may include perception sensors similar to the perception sensors 36 described above with respect to haul machine 11. Raw data points from the perception sensors may be provide to a perception system similar to the perception system 35 described above to create the electronic map 38. The electronic map of the berm 104 may form a part of an electronic map 38 of the work site 100.

During a material moving operation, the off-board controller 126 may be configured to regulate the movements of haul machines 11 relative to different routes that include the travel paths and dump targets 112. In the case of autonomously operated haul machines 11, the on-board controller 43 of the corresponding machines may be instructed by the off-board controller 126 to direct the operation of haul machines 11 relative to the different travel paths and dump targets 112. In the case of manually controlled haul machines 11, the on-board controller 43 of each machine may cause the routes to different dump targets 112 to be displayed on an electronic representation of work site 100 provided on a display device (not shown) within the haul machine 11.

During the process of dumping a payload of a haul machine 11 over the high wall 103, the coordinates for a particular dump target 112 may be assigned as a target for each haul machine 11. Each haul machine 11 may be moved autonomously or manually to the dump target 112 until it engages the berm 104. Instructions may be sent to autonomously or manually dump the material within the payload container 23 over the high wall 103. Over time, the haul machines 11 engaging the berm 104 may result in the structure of the berm being compromised or damaged. In such case, the berm 104 may not provide an adequate boundary for the high wall 103 as desired. When the berm 104 no longer has its desired shape, it is less likely to stop or assist the positioning of the haul machine 11 at the desired location adjacent the high wall 103. This may increase the risks associated with operating the haul machines 11 adjacent the high wall 103.

In addition, at times, portions of the dump location 102 adjacent the high wall 103 may become unstable or degrade while operating the haul machines 11 adjacent the dump location. Such instability or degradation of portions of the dump location 102 may be reflected by movement or changes in the berm 104 adjacent the dump location. For example, changes or shifts in the underlying material adjacent the dump location 102 beneath the berm 104 may cause similar changes or shifts in the berm 104 at or adjacent such changes or shifts in the material. If portions of the dump location 102 are determined to be unstable or have degraded, those portions may no longer be used and haul machines 11 may be re-directed to other dump targets 112.

Control system 40 may include a failure prediction and notification system 48 that monitors the physical characteristics of the berm 104. In one aspect, changes in the physical characteristics of the berm 104 may be compared to stored characteristic difference thresholds to determine whether the changes in the berm exceed any of the thresholds. In some instances, changes to the berm 104 that exceed a characteristic difference threshold may only reflect issues with the berm. In such case, a work site planning system (not shown) may generate instructions for haul machines 11 to avoid the portion of the berm 104 that exceeds the characteristic difference threshold and also generate instructions to inspect/rebuild the affected portion of the berm. In other instances, changes to the berm 104 that exceed a characteristic difference threshold may reflect instability or degradation of the material at a portion of the dump location 102. In such case, the work site planning system may generate instructions for haul machines 11 to avoid the portion of the berm that exceeds the characteristic difference threshold and also generate instructions to inspect the dump location 102.

In another aspect, the physical characteristics of the berm 104 may be compared to stored characteristic thresholds to determine whether the physical characteristics of the berm exceed any of the stored characteristic thresholds. Similar to that described above, in some instances, characteristics of the berm 104 that exceed a characteristic threshold may only reflect problems with the berm. In such case, the work site planning system may generate instructions for haul machines 11 to avoid the portion of the berm that exceeds the characteristic threshold and also generate instructions to inspect/rebuild the affected portion of the berm 104. In other instances, characteristics of the berm 104 that exceed a characteristic threshold may reflect problems with the material at a portion of the dump location 102. In such case, the work site planning system may generate instructions for haul machines 11 to avoid the portion of the berm that exceeds the characteristic threshold and also generate instructions to inspect the dump location 102.

The characteristics of the berm 104 (and thus also any changes in the berm) may be determined based upon data generated from a perception system. The perception system may be disposed on-board haul machines 11 that are operative to dump material over the high wall 103 or may be disposed on other machines or devices remote from the haul machines 11.

In addition, in some instances, failure prediction and notification system 48 may also be configured to determine a change in the slope of the work surface 105 adjacent the berm 104 and compare such change to a slope change threshold. If the change in slope exceeds the slope change threshold, the work site planning system may generate instructions for haul machines 11 to avoid the area adjacent the location at which the change in slope exceeds the slope change threshold and also generate instructions to inspect the dump location 102.

In still another aspect, the rate of change of aspects of the topography may be measured by the failure prediction and notification system 48. For example, relatively rapid changes in some of the characteristics of the dump location 102 or berm 104 may be indicative of potential instability or degradation of the dump location and/or the berm. Accordingly, additional thresholds may be provided that include a rate of change threshold as a function of time.

A plurality of characteristic difference thresholds, characteristic thresholds, slope change thresholds, and rate of change thresholds may be stored within controller 41, such as within on-board controller 43 and/or off-board controller 126. The thresholds may identify instances in which it may be desirable to avoid certain portions of the dump location 102, generate a request to re-build a portion of the berm 104, and/or inspect a portion of the dump location. More specifically, the characteristic difference thresholds may identify instances in which a change in the characteristics of the berm 104 exceed a threshold, the characteristic thresholds may identify instances in which the characteristics of the berm exceed a threshold, the slope change thresholds may identify instances in which a change in the slope adjacent the berm exceeds a threshold, and the rate of change thresholds may identify instances in which a rate of change exceeds a threshold.

Examples of characteristics of the berm 104 that may be monitored include the height of the top wall 107, the shape of the top wall, the shape and/or angle of the sidewall 108, and the location of the inner edge 106 of the berm. Cracks in the berm 104 may also be monitored and operate as an additional characteristic of the berm. For example, cracks in the berm 104 may be indicative of shifts in the berm even though the general topography (e.g., the height and shape of the top wall 107, the shape and angle of the sidewall 108, and the location of the inner edge 106) or a change in the topography does not exceed one of the thresholds. Thresholds directed to cracks in the berm 104 may include the width, length, and orientation of any cracks. These crack thresholds may also take into account the resolution of the perception system generating the electronic map 38 of the berm 104. For example, a threshold width of a crack may not be less than the resolution capability of the perception system.

As an example, a characteristic threshold of a berm 104 may be set at a specific height so that an alert 39 (FIG. 3) is generated if the top wall 107 of the berm is less than the specified height, regardless of the initial height of the top wall.

In some instances, segments of the berm 104 of predetermined lengths may be evaluated so that a threshold must be met over or an entire segment or a specified length of the berm. In other words, in some instances, evaluation lengths may be set and an alert 39 generated if the threshold is met over the entire evaluation length. The evaluation lengths may be identical or different for each of the thresholds.

In some instances, the thresholds may be analyzed individually to determine whether any threshold has been exceeded. In addition or in the alternative, two or more thresholds may be combined to generate an aggregate threshold wherein the aggregate threshold may be exceeded even though the individual thresholds have not. For example, an aggregate threshold directed to the change in height of top wall 107 and the change in the slope of sidewall 108 may be exceeded even if the change in the height of the top wall and the change in the slope of the sidewall 108 do not exceed their respective individual thresholds. Similarly, it may be desirable to analyze the width, length, and orientation of any cracks as well as the number of cracks in a portion of the berm 104.

The thresholds may be set based upon the type of operating conditions in which the haul machine 11 is operating. For example, the conditions of the soil or material that make up the dump location 102 including the high wall 103 and work surface 105 may affect the durability of the material at the dump location and berm 104. In addition, changes in the dump location 102 and berm 104 may be manifested in different manners depending on the soil composition. As examples, it may be desirable to differentiate thresholds based upon whether the soil includes high levels of sand, black dirt, or rocks. Further or additional differentiations in thresholds may be made based upon the moisture content of the soil.

INDUSTRIAL APPLICABILITY

The industrial applicability of the system described herein will be readily appreciated from the forgoing discussion. The foregoing discussion is applicable to systems that are operated to assist in moving material near a dump location 102 having a berm 104 or another raised contour. The system may be used at a mining site, a landfill, a quarry, a construction site, a roadwork site, or any other area in which movement of material near a high wall is desired.

As machines, such as haul machines 11, operate near the dump location 102, the material at the dump location, including the berm 104 along a high wall 103, may become unstable or require re-building. A perception system 35 may be provided, such as on a haul machine 11, for generating ongoing electronic maps 38 of the topography adjacent the dump location 102.

Changes in the topography and the overall dimensions of the topography may be used to predict instability of the dump location 102 and berm 104 as well as the need for rebuilding. More specifically, changes in the topography may be compared to characteristic difference thresholds, slope change thresholds, and rate change thresholds and the overall dimensions of the topography may be compared to characteristic thresholds. If any of the thresholds are exceeded, an alert 39 may be generated and the portion of the dump location 102 giving rise to the alert may be avoided by future haul machines 11. In addition, instructions may be generated to inspect and/or re-build the topography near the dump location 102.

Figure 7:
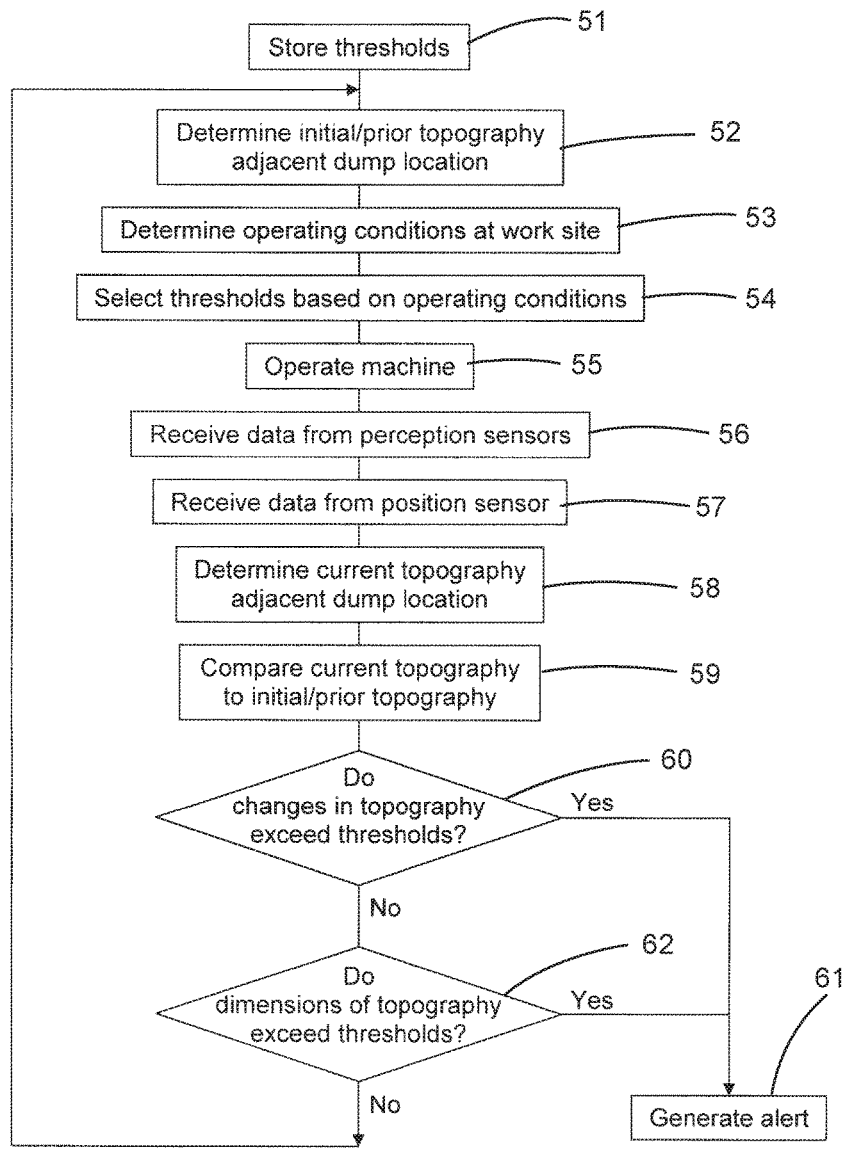
FIG. 7 is a flowchart of a process of a machine operating with a failure prediction and notification system.

FIG. 7 depicts one example of the operation of the failure prediction and notification system 48. At stage 51, characteristic difference thresholds, characteristic thresholds, slope change thresholds, and rate of change thresholds may be set or stored. In one example, the thresholds may be set or stored off-board the haul machine 11 by off-board controller 126. A determination of the initial topography adjacent the dump location 102 may be determined at stage 52. To do so, machines or devices including perception sensors similar to perception sensors 36 may be positioned sufficiently close to the dump location 102 to generate raw data points indicative or reflective of the work environment at the dump location. The raw data points may be provided to a perception system similar to perception system 35 to create an electronic map 38 of the dump location 102. The electronic map 38 may include the location of the berm 104 as well as the work surface 105. In some instances, the location of the high wall 103 may also be included. The electronic map 38 may be used to determine the initial physical characteristics of various aspects of the work surface 105 including the berm 104.

At stage 53, the operating conditions such as soil conditions at the work site 100 may be determined. The operating conditions may be determined or estimated by an operator, management personnel, or set by another system. The thresholds may be selected or set at stage 54 based upon the operating conditions. In other embodiments, the thresholds may be selected or set without regard to the operating conditions.

At stage 55, the haul machine may be operated at the work site 100. Data such as raw data points may be received at stage 56 by the controller 41 from the perception sensors 36. Data such as position signals may be received at stage 57 by controller 41 from the position sensor 31. At stage 58, the controller 41 may determine the current topography of the work site 100 adjacent the dump location 102 based upon the data received from the position sensor 31 and the perception sensors 36. In doing so, the controller 41 may generate an electronic map 38 of the work site 100 adjacent the dump location 102. The electronic map 38 may be used to determine the current physical characteristics of various aspects of the work surface 105 including the berm 104.

The controller 41 may compare the current topography of the work site 100 adjacent the dump location 102 to the initial topography at stage 59. In doing so, the controller 41 may compare the initial physical characteristics to the current physical characteristics. At decision stage 60, the changes in the topography may be compared to the characteristic difference thresholds stored within the controller 41. If any of the changes exceed the characteristic difference thresholds, an alert 39 may be generated at stage 61. The alert 39 may cause the modification of the electronic map 38 of the work site 100 so that portions of the dump location 102 are avoided and haul machines 11 and other machines are re-routed around those portions of the dump location. In addition or in the alternative, instructions or requests may be generated for inspection of the identified portions of the dump location. Such inspection may be carried out in any desired manner (e.g., human inspection and/or machine inspection) and may be used to determine, for example, whether a portion of the berm 104 requires re-building or whether the material adjacent the identified portion of the dump location 102 has become unstable.

In some instances, stages 59-60 may also compare the current topography to one or more previous or prior electronic maps (as compared to the initial electronic map) to determine a rate of change of any aspects of the topography. For example, rapid changes in some of the characteristics of the dump location 102 or berm 104 may be indicative of potential issues with the dump location and/or the berm and may cause an alert 39 to be generated even though a difference between the initial topography and the current topography do not exceed any of the thresholds.

Although many issues with the dump location 102 or berm 104 may be identified based upon changes in the topography, there may be instances in which the overall dimensions of the topography are indicative of concerns with the dump location or berm. As a result, if the changes in topography do not exceed any of the thresholds at decision stage 60, the controller 41 may determine at decision stage 62 whether the dimensions of any aspect of the topography exceed any of the characteristic thresholds. If the dimensions of any aspect of the topography exceed any of the characteristic thresholds, an alert 39 may be generated at stage 61 as described above. If dimensions of the topography do not exceed any of the thresholds at decision stage 62, the operation of haul machine 11 (and other machines at the work site 100) may be continued at stages 52-62 with each of the dump targets 112 continuing to be used. In other embodiments, the operation of the haul machine 11 may be modified to continue at other or additional stages or discontinued altogether.

It will be appreciated that the foregoing description provides examples of the disclosed system and technique. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A failure prediction and notification system for use at a work site, the work site having a work surface including a raised contour, and the work site further including a plurality of dump targets adjacent the raised contour, comprising:
    a perception sensor mounted on a machine for generating raw data points reflective of a perceived work environment associated with the machine;
    a controller configured to:
        store a characteristic difference threshold;
        store an electronic map of an initial topography of the work surface adjacent the raised contour;
        determine an initial physical characteristic of the initial topography of the work surface adjacent the raised contour;
        receive the raw data points from the perception sensor;
        generate an electronic map of a current topography of the work surface adjacent the raised contour based at least partially on the raw data points;
        determine a current physical characteristic of the current topography of the work surface adjacent the raised contour;
        determine a difference between the current physical characteristic and the initial physical characteristic;
        compare the difference between the current physical characteristic and the initial physical characteristic to the characteristic difference threshold;
        generate an alert upon the difference between the current physical characteristic and the initial physical characteristic exceeding the characteristic difference threshold, the alert including target instructions to direct haul machines to avoid dump targets adjacent a portion of the raised contour at which the difference between the current physical characteristic and the initial physical characteristic exceeds the characteristic difference threshold, and further including inspection and/or repair instructions to direct an inspection and/or repair of the portion of the raised contour; and
        generate haul machine movement commands based upon the alert to move each haul machine to one of the dump targets while avoiding dump targets adjacent the portion of the raised contour at which the difference between the current physical characteristic and the initial physical characteristic exceeds the characteristic difference threshold.

2. The failure prediction and notification system of claim 1, wherein the raised contour includes a top wall, and the current physical characteristic and the initial physical characteristic comprise a height of the top wall above the work surface.

3. The failure prediction and notification system of claim 1, wherein the raised contour includes an inward edge, a top wall, and a sloped sidewall extending between the inward edge and the top wall, and the current physical characteristic and the initial physical characteristic comprise an angle of the sloped sidewall.

4. The failure prediction and notification system of claim 1, wherein the raised contour includes a crack and the current physical characteristic and the initial physical characteristic comprise a length of the crack.

5. The failure prediction and notification system of claim 1, wherein the raised contour includes a crack and the current physical characteristic and the initial physical characteristic comprise a width of the crack.

6. The failure prediction and notification system of claim 1, wherein the controller is further configured to transmit the alert to a system remote from the machine.

7. The failure prediction and notification system of claim 6, wherein the alert includes a request for human inspection.

8. The failure prediction and notification system of claim 1, wherein the current physical characteristic and the initial physical characteristic comprise a slope of the work surface adjacent the raised contour.

9. The failure prediction and notification system of claim 8, further including a position sensor on-board the machine for generating position signals indicative of a pose of the machine, and the controller is configured to determine the pose of the machine based upon the position signals, determine a slope of the work surface adjacent the raised contour based upon pose of the machine, and the characteristic difference threshold comprises a slope change threshold.

10. The failure prediction and notification system of claim 1, wherein the controller is further configured to store a characteristic threshold, compare the characteristic threshold to the current physical characteristic of the current topography, generate a second alert upon the current physical characteristic exceeding the characteristic threshold, and transmit the second alert to a system remote from the machine.

11. The failure prediction and notification system of claim 1, wherein the characteristic difference threshold is stored by an on-board controller on the machine, and the on-board controller is configured to compare the difference between the current physical characteristic and the initial physical characteristic to the characteristic difference threshold.

12. The failure prediction and notification system of claim 1, wherein the characteristic difference threshold is stored by an off-board controller remote from the machine, and the off-board controller is configured to compare the difference between the current physical characteristic and the initial physical characteristic to the characteristic difference threshold.

13. The failure prediction and notification system of claim 1, wherein the controller is configured to store a plurality of characteristic difference thresholds, the plurality of characteristic difference thresholds corresponding to different soil conditions of the work surface.

14. A method of failure prediction and notification for use at a work site, the work site a work surface including a raised contour, and the work site further including a plurality of dump targets adjacent the raised contour, comprising:
   storing a characteristic difference threshold;
   storing an electronic map of an initial topography of the work surface adjacent the raised contour;
   determining an initial physical characteristic of the initial topography of the work surface adjacent the raised contour;
   receiving raw data points from a perception sensor mounted on a machine;
   generating an electronic map of a current topography of the work surface adjacent the raised contour based at least partially on the raw data points;
   determining a current physical characteristic of the current topography of the work surface adjacent the raised contour;
   determining a difference between the current physical characteristic and the initial physical characteristic;
   comparing the difference between the current physical characteristic and the initial physical characteristic to the characteristic difference threshold;
   generating an alert upon the difference between the current physical characteristic and the initial physical characteristic exceeding the characteristic difference threshold, the alert including generating target instructions to direct haul machines to avoid dump targets adjacent a portion of the raised contour at which the difference between the current physical characteristic and the initial physical characteristic exceeds the characteristic difference threshold, and further including generating inspection and/or repair instructions to direct an inspection and/or repair of the portion of the raised contour; and
   moving each haul machine to one of the dump targets based upon the alert while avoiding dump targets adjacent the portion of the raised contour at which the difference between the current physical characteristic and the initial physical characteristic exceeds the characteristic difference threshold.

15. The method of claim 14, further comprising comparing a difference between the current physical characteristic and a prior physical characteristic of the topography to determine a rate of change as a function of time and generating a second alert upon the difference between the current physical characteristic and the prior physical characteristic exceeding a rate of change threshold.

16. The method of claim 14, further comprising transmitting the alert to a system remote from the machine and requesting human inspection.

17. The method of claim 14, further comprising storing the plurality of characteristic difference thresholds off-board the machine, and comparing the difference between the plurality of current physical characteristics and the plurality of initial physical characteristics to the plurality of characteristic difference thresholds off-board the machine.

18. The method of claim 14, further comprising storing a plurality of characteristic difference thresholds, the plurality of characteristic difference thresholds corresponding to different soil conditions of the work surface.

19. A failure prediction and notification system for use at a work site, the work site having a work surface including a raised contour, the raised contour comprising an inward edge, a top wall, and a sloped sidewall extending between the inward edge and the top wall, and the work site further including a plurality of dump targets adjacent the raised contour, comprising:
   a perception sensor mounted on a machine for generating raw data points reflective of a perceived work environment associated with the machine;
   a controller configured to:
      store a plurality of characteristic difference thresholds, the plurality of characteristic difference thresholds corresponding to a height of the top wall above the work surface and an angle of the sloped sidewall;
      store an electronic map of an initial topography of the work surface adjacent the raised contour;
      determine a plurality of initial physical characteristics of the initial topography of the work surface adjacent the raised contour, the plurality of initial physical characteristics comprising the height of the top wall above the work surface and the angle of the sloped sidewall;
      receive the raw data points from the perception sensor;
      generate an electronic map of a current topography of the work surface adjacent the raised contour based at least partially on the raw data points;
      determine a plurality of current physical characteristics of the current topography of the work surface adjacent the raised contour, the plurality of current physical characteristics comprising the height of the top wall above the work surface and the angle of the sloped sidewall;
      determine differences between the plurality of current physical characteristics and the plurality of initial physical characteristics;
      compare the differences between the plurality of current physical characteristics and the plurality of initial physical characteristics to respective characteristic difference thresholds;

generate an alert upon any of the differences between the plurality of current physical characteristics and the plurality of initial physical characteristics exceeding the respective characteristic difference thresholds, the alert including target instructions to direct haul machines to avoid dump targets adjacent a portion of the raised contour at which the difference between the current physical characteristic and the initial physical characteristic exceeds the characteristic difference threshold, and further including inspection and/or repair instructions to direct an inspection and/or repair of the portion of the raised contour; and generate haul machine movement commands based upon the alert to move each haul machine to one of the dump targets while avoiding dump targets adjacent the portion of the raised contour at which the difference between the current physical characteristic and the initial physical characteristic exceeds the characteristic difference threshold.

20. The failure prediction and notification system of claim 19, wherein the plurality of characteristic difference thresholds are stored by an off-board controller remote from the machine, and the off-board controller is configured to compare the difference between the plurality of current physical characteristics and the plurality of initial physical characteristics to the plurality of characteristic difference thresholds.

* * * * *